(12) United States Patent
Matousek et al.

(10) Patent No.: US 10,238,038 B2
(45) Date of Patent: Mar. 26, 2019

(54) ADJUSTABLE TOP COVER VANES FOR CONTROLLING CROP FLOW IN A ROTARY THRESHER

(71) Applicant: Tribine Industries LLC, Logansport, IN (US)

(72) Inventors: Robert A. Matousek, Valley Center, KS (US); Bryan S. Claerhout, Hesston, KS (US)

(73) Assignee: Tribine Industries LLC, Logansport, IN (US)

( * ) Notice: Subject to any disclaimer, the term of this patent is extended or adjusted under 35 U.S.C. 154(b) by 0 days.

(21) Appl. No.: 15/623,619

(22) Filed: Jun. 15, 2017

(65) Prior Publication Data

US 2018/0153104 A1    Jun. 7, 2018

Related U.S. Application Data

(60) Provisional application No. 62/358,624, filed on Jul. 6, 2016.

(51) Int. Cl.
| | |
|---|---|
| *A01F 7/06* | (2006.01) |
| *A01F 12/18* | (2006.01) |
| *A01F 12/28* | (2006.01) |
| *A01D 41/12* | (2006.01) |
| *B60K 11/08* | (2006.01) |

(52) U.S. Cl.
CPC .............. *A01F 7/067* (2013.01); *A01D 41/12* (2013.01); *A01F 12/181* (2013.01); *A01F 12/28* (2013.01); *B60K 11/08* (2013.01)

(58) Field of Classification Search
CPC ......... A01F 7/067; A01F 12/181; A01F 12/28
See application file for complete search history.

(56) References Cited

U.S. PATENT DOCUMENTS

| | | | | |
|---|---|---|---|---|
| 990,007 | A * | 4/1911 | Reason | A01F 7/06 460/67 |
| 4,244,380 | A * | 1/1981 | DePauw | A01F 7/067 460/108 |
| 4,258,726 | A * | 3/1981 | Glaser | A01F 12/24 460/109 |
| 4,541,441 | A * | 9/1985 | Ichikawa | A01F 12/442 460/66 |
| 2009/0111547 | A1 * | 4/2009 | Pope | A01F 7/067 460/80 |
| 2011/0320087 | A1 * | 12/2011 | Farley | A01F 7/067 701/34.2 |
| 2016/0000009 | A1 * | 1/2016 | Duquesne | A01F 7/067 460/66 |

* cited by examiner

*Primary Examiner* — Alicia Torres
(74) *Attorney, Agent, or Firm* — Mueller Law, LLC; Jerry K. Mueller, Jr.

(57) ABSTRACT

Disclosed is a harvesting combine rotor cage top cover assembly that includes an overhead roof formed from a substantially horizontal flat section and downwardly angled side sections. A series of substantially parallel vanes are located beneath the overhead roof. Each vane is formed from a substantially flat top section located against the roof horizontal flat section and downwardly laterally extending legs being angled on their sides and having an arcuate bottom. The sides of the vanes are rotatable about a central pivot for promoting or retarding the flow of material in the rotor cage.

4 Claims, 13 Drawing Sheets

ADJUSTABLE TOP COVER VANES FOR CONTROLLING CROP FLOW IN A ROTARY THRESHER

CROSS-REFERENCE TO RELATED APPLICATIONS

This application claims benefit of U.S. provisional application Ser. No. 62/358,624 filed Jul. 6, 2016.

STATEMENT REGARDING FEDERALLY SPONSORED RESEARCH

This application is cross-referenced to application Ser. No. 14/946,827 filed Nov. 20, 2015; Ser. No. 14/946,842 filed Nov. 20, 2015, now U.S. Pat. No. 9,901,030; and Ser. No. 14/967,691, filed on Dec. 14, 2015, now U.S. Pat. No. 9,820,442.

BACKGROUND

The present disclosure relates to harvesting combines that use rotary threshing of severed crop and more particularly to controlling the rate of crop flowing through the rotary threshing system and, consequently, threshing aggression, separation efficiency, and power consumption.

In a grain harvesting machine that uses the rotary type of threshing and separating process where the crop enters one end of the rotor encasement (cage) and is turned around and around in that cage by the spinning rotor with threshing element protrusions on its outer skin, it is normal to have long, blade like protrusions on the inner circumference of the cage in select locations. These protrusions engage the spinning crop and force it to move rearwardly in the cage along these blades (called guide vanes, or simply vanes). In a rotor cage that is essentially round or oval in shape, this requires that the vanes be designed with a radius of curvature that corresponds to the curvature of the cage at the place and orientation where the vane is attached to the cage. It is currently typical and exclusive that these vanes occur only in areas that are not part of the concave and grate components of the cage, and are limited to the non-removable upper portions of the cage.

In some cases, the vanes are permanently attached to the cage, often at the top of the cage on components known as top covers and, as such, can only have one effect on the crop flow—to accelerate or retard rearward progression of the crop material along the vane's angle of inclination. In other cases the vanes can be located on the sides of the cage (typically above the vertical midpoint of the cage circle) and bolted to (through) the cage wall in a system of slots that allow the pitch angle of the vanes to be altered. This adjustability of the vanes gives the operator of the machine the option to change the pitch of the vanes in order to either retard or accelerate the movement of crop through the rotary thresher. This adjustability is accomplished by means of wrenches and pry bars, at some significant human distress given that there are significant quantities of irritating crop dust present. The changing process often is the deterrent to making such changes, even though the operator knows the change would improve performance.

Secondly, and not insignificantly, the shape of the vane (when it is standing more perpendicular to the flow) is significantly different than when it is laying back and less perpendicular to the direction of crop flow. This necessarily requires that the vane physically deform within the elastic range of the steel in the vanes, leads to significant resistance to changing of the vane angle, and requires numerous very tight bolts to maintain the deformation up against the inner wall of the cage. The gripping force required to keep the vanes at the proper angle actually precludes any kind of movement without loosening the bolts and precludes any type of actuator moving the vanes in concert by some powered mechanical means. Therefor, most needed vane angle adjustments simply are not implemented even though the needed angle(s) of the vanes changes routinely with crop type and crop condition. To the operator, it is "just not worth getting dirty and skinning knuckles!"; even though the adjustment could result in a profound improvement in machine productivity.

To date, any attempt to remotely control these vane angles (given the change in ovality of the vane versus cage) has amounted to simply "wagging" the tail of a few of the vanes in that the cantilevered and hinged short section on the trailing end of the vane is allowed to change the angle of an insignificant length of a chosen few vanes. Change in performance is not significant, and the feature is largely face value versus functionality.

BRIEF SUMMARY

Disclosed is a harvesting combine rotor cage top cover assembly that includes an overhead roof formed from a substantially horizontal flat section and downwardly angled side sections. A series of substantially parallel vanes are located beneath the overhead roof. Each vane is formed from a substantially flat top section located against the roof horizontal flat section and downwardly laterally extending legs being angled on their sides and having an arcuate bottom. The sides of the vanes are rotatable about a central pivot for promoting or retarding the flow of material in the rotor cage.

BRIEF DESCRIPTION OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION

This disclosure provides a unique and much needed threshing improvement by disclosing a significantly new top cover configuration that allows the vanes to be gang moved by linear actuators, such as, hydraulically powered linear actuators. An enabling design feature that fosters the new top cover of the rotor cage is the new concaves and grates design that effectively wrap around roughly ±270° of the lower cage of considerably larger diameter than current rotary threshers, as disclosed in commonly owned application Ser. No. 14/967,691, referenced above. Since the radius of curvature of the (shorter) top cover is so large, the greater part of this cover (middle portion) can be flat, letting the curvature of the bottom (crop engaging) edge of the gang of vanes provide the virtual curvature for the crop to flow. This flat section allows for the positioning of vanes on a surface that allows them to slide fore and aft when forced to do so. The vanes are not required to structurally deform, nor are they required to be securely fastened to the surface of the cover; thus, allowing instead for the actuation mechanisms to hold them in place and orientation.

The vanes can be angle shaped, usefully made of steel, and of the correct width and length to fill the span appropriately for truly circumferential orientation, as well as at angles that are significantly laid back relative to circumferential. The lower edge of these vane components will be cut such that the lower edge is radiused, so that it corresponds to the general swept diameter of the rasp bars on the rotating rotor. The upper leg of the vane angle shape will be laid up against the flat top cover and held close to the cover's bottom surface by bolts with bushings that effectively hold the vanes slightly off the surface to allow movement. These bushings are long, and they insert through slots in the cover that describe the radius of movement back and forth for the bushings at either end of the vane, with the middle bushing being fixed in its location causing it to be the pivot point of the movement.

The adjusting mechanism, then, includes long tubes or thick flat bars (bars will be used hereinafter for this component) that have large holes that tightly accept the bushing to pass through and rotate. These bars, then, are the mechanisms that tie all of the vanes into a single gang for simultaneous adjustment of all the vanes. As the bars are forced forward and rearward, the movement of one bar is opposite the movement of the other bar. Given that the bars have significant depth, the length of the constrained bushings through the bars will stabilize the vanes to prevent most deflection of the lower leg, even though the vanes are not rigidly fastened to the cover surface.

The net of these design features is a system that will by remote actuation allow the changing of the angle of the vanes and, thereby, the varying regulation of the speed of crop flow through the length of the rotor. This adjustment in itself can be a very effective means of controlling and sincerely changing the rate of crop flow through the threshing system and, consequently, such variables as threshing aggression, separation efficiency, and rotor power consumption.

Referring initially to FIGS. 1, 2, 3, and 4, an articulated harvester, 10, consists of a forward powered PPU, 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015. PPU 12 carries a grainhead, 18, shown in a down harvesting position in FIG. 1 and in an up non-harvesting position in FIG. 3, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10.

An off-loading auger assembly, 22, is in the folded home position and is carried by rear grain cart 14. Grain cart 14 also supports a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin, 28, is housed within grain cart 14 and also may be made of plastic also in keeping with desirable weight reduction; although, it could be made of metal at the expense of weight. All plastic parts may be filled with particulate filled or fiber reinforced in conventional fashion and could be laminate in construction. Further details on rear grain cart 14 can be found commonly owned application Ser. No. 14/946,842 filed Nov. 20, 2015.

Figure 1:
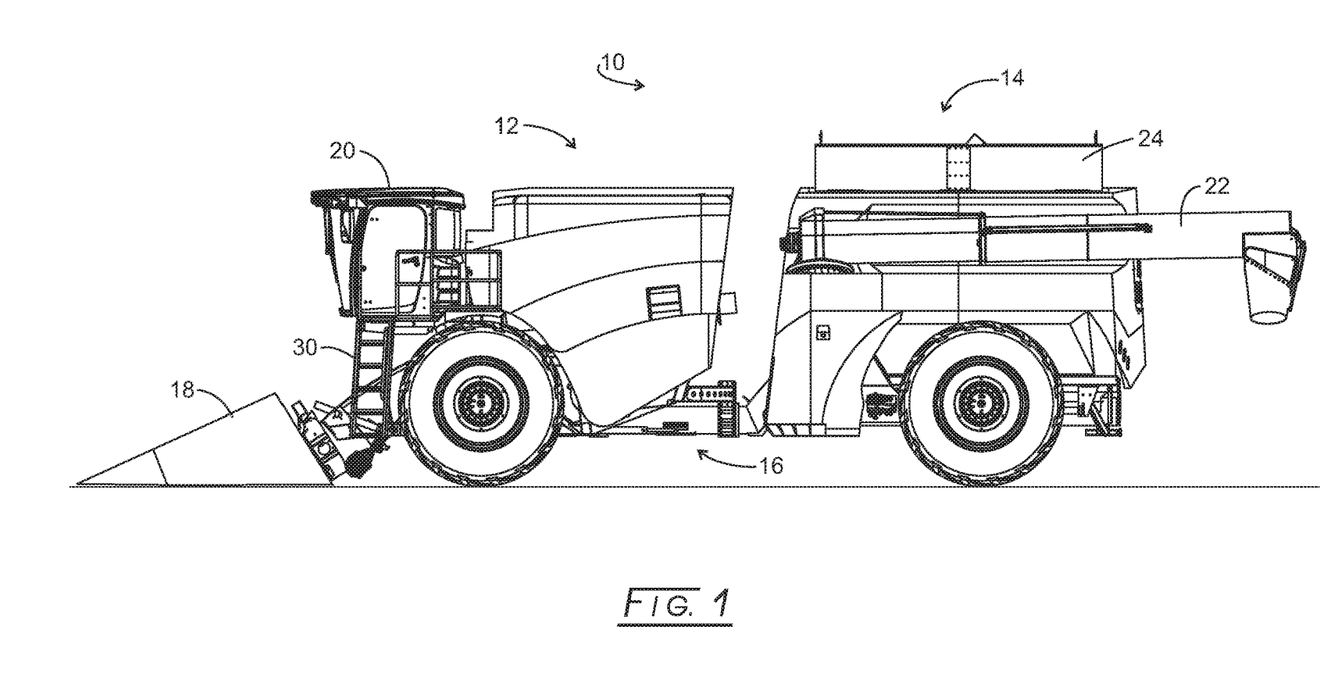
FIG. 1 is a side elevation view of an articulated combine of a forward crop processing unit (PPU), articulation joint, and grain cart, where the grainhead is down in a crop harvesting position.
Figure 2:
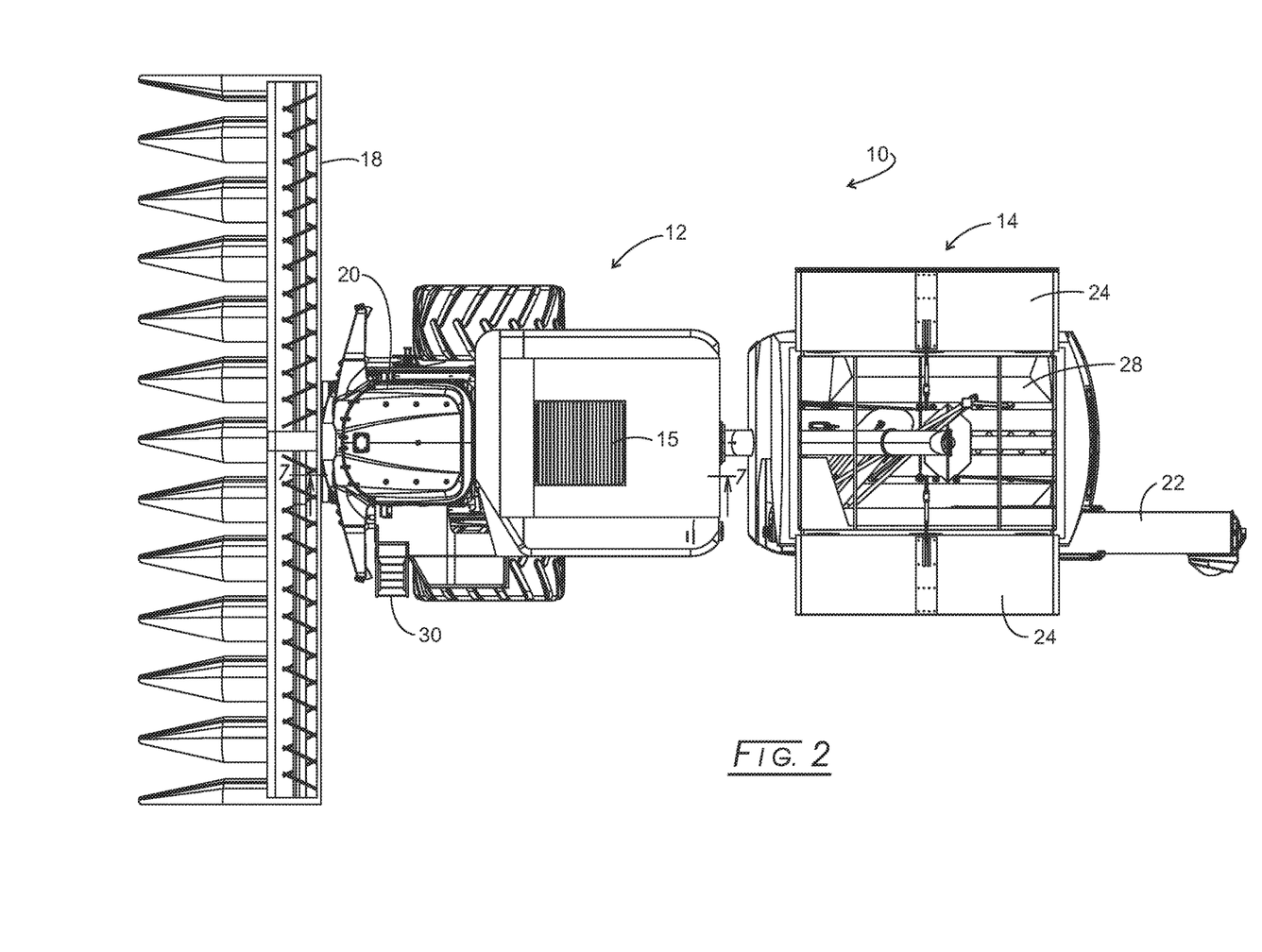
FIG. 2 is an overhead view of the articulated combine of FIG. 1.
Figure 3:
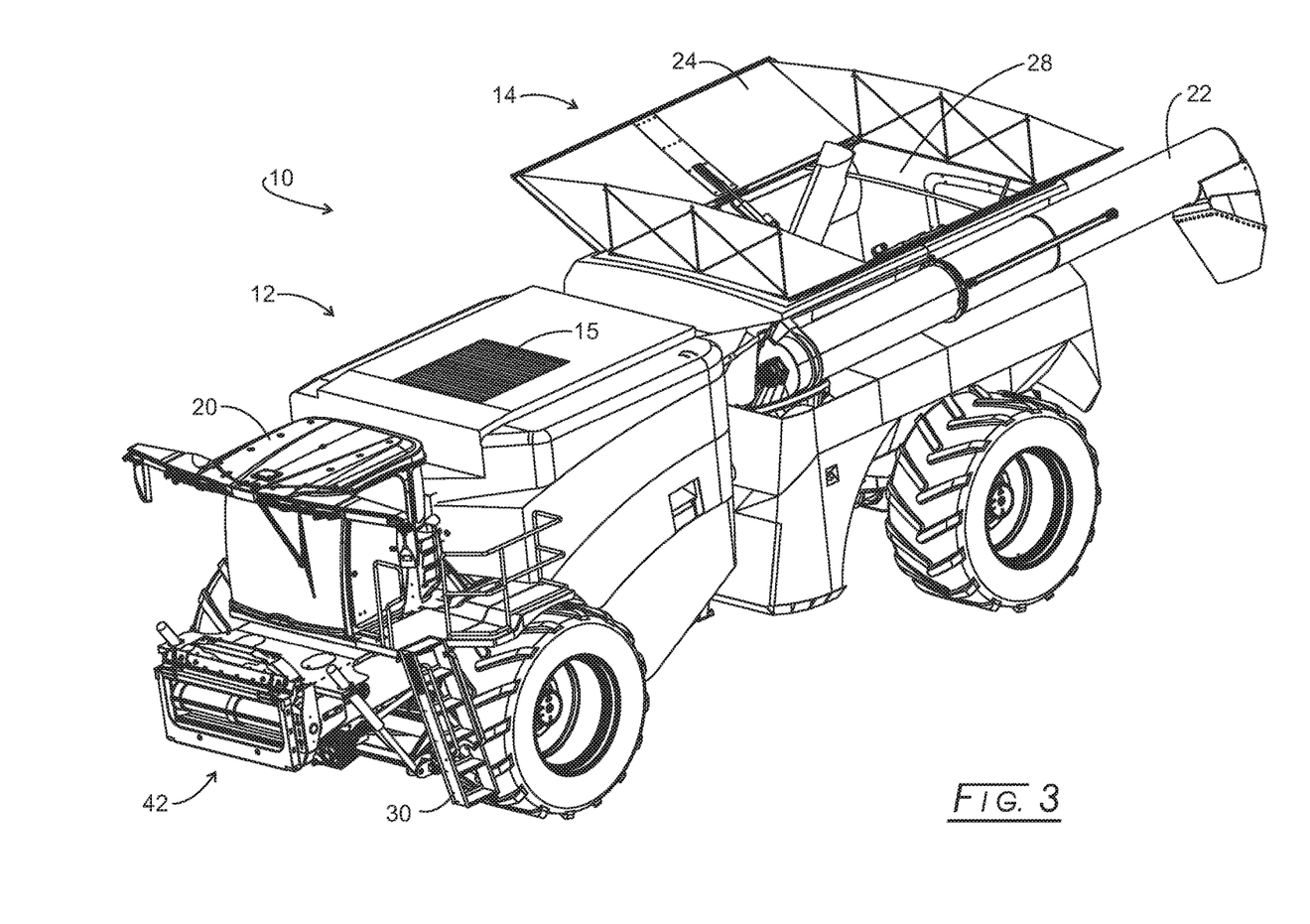
FIG. 3 is an isometric view of the PPU of FIG. 1 with the grainhead removed.
Figure 4:
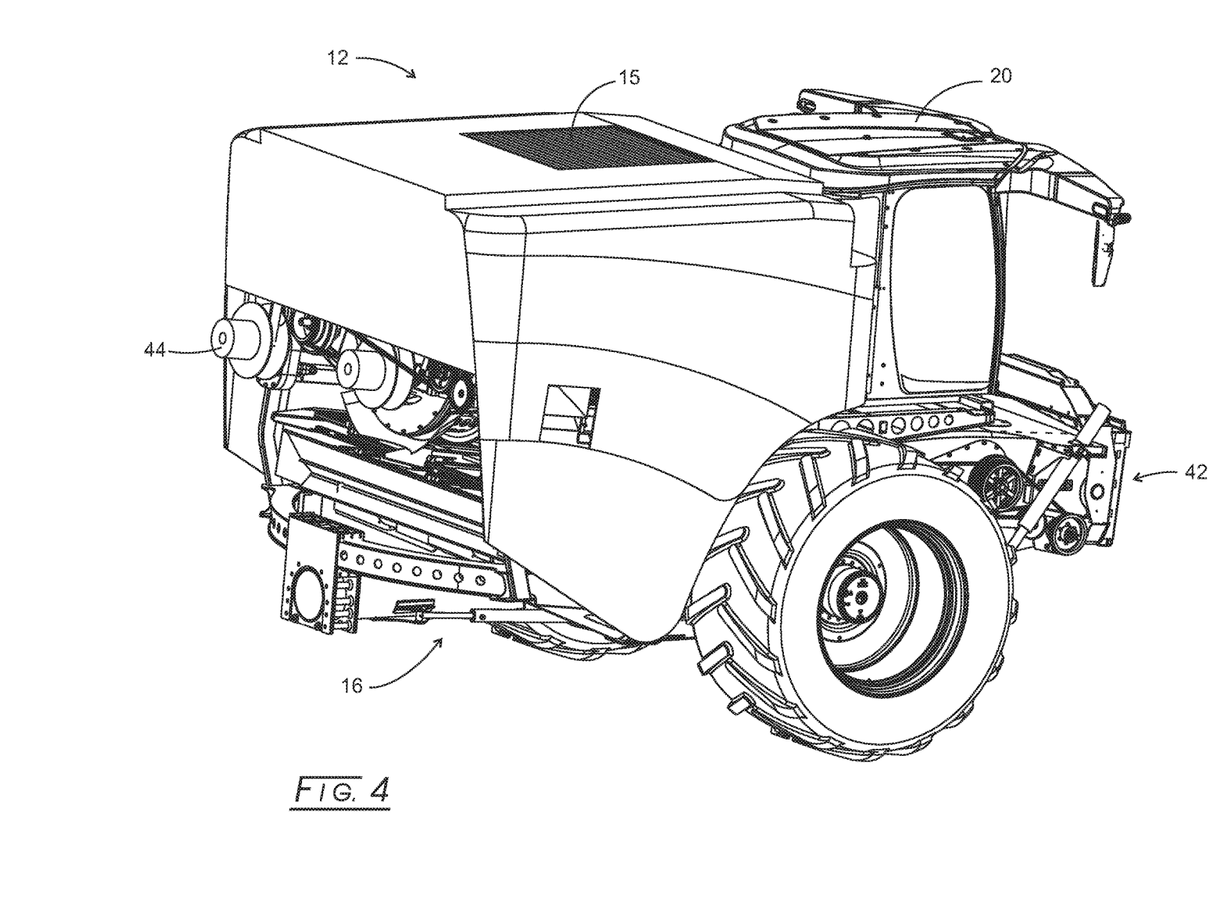
FIG. 4 is the isometric view of only the PPU from the rear.
Figure 5:
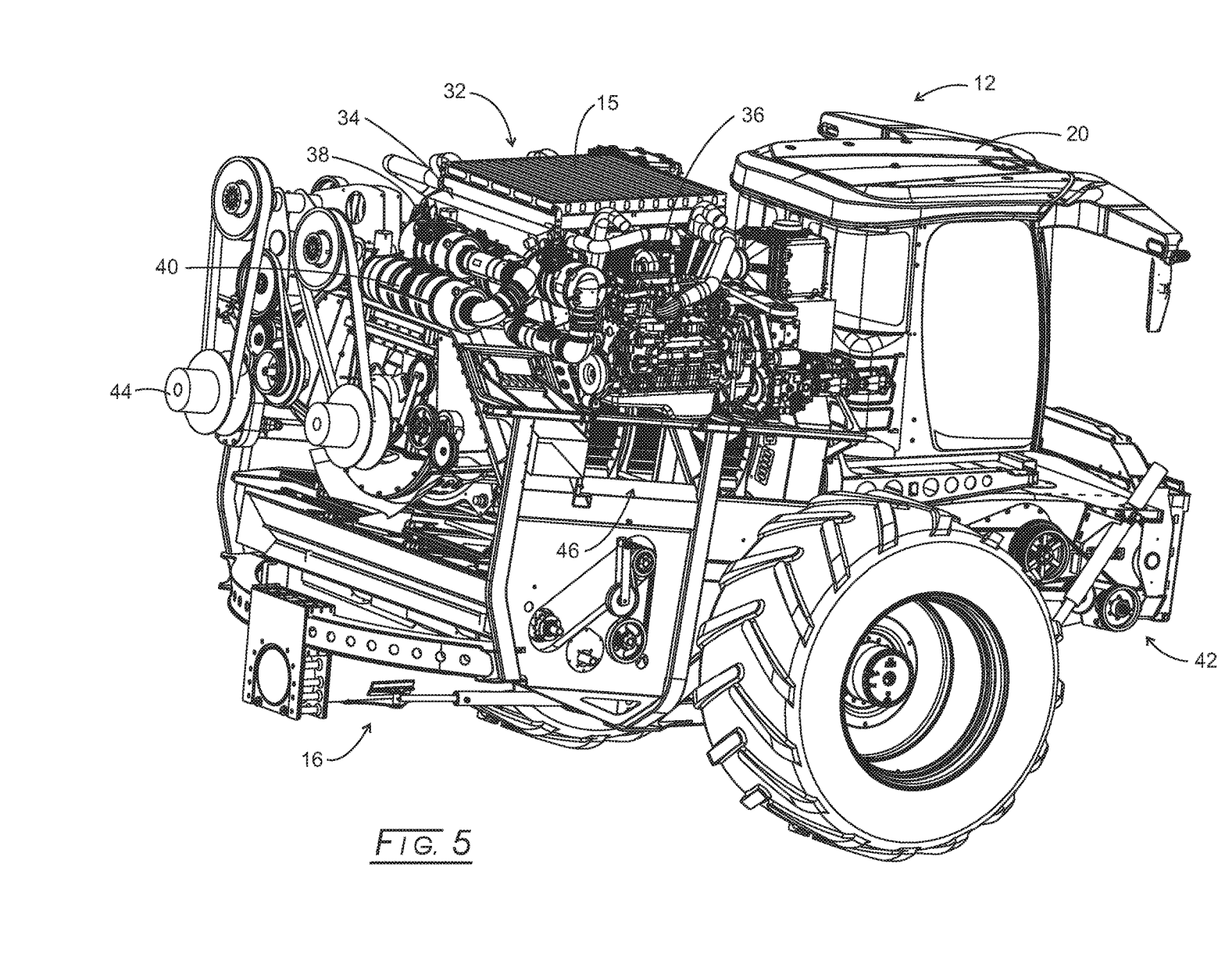
FIG. 5 is an isometric view like FIG. 4, but with the outer shell or skin removed from the PPU.
Figure 6:
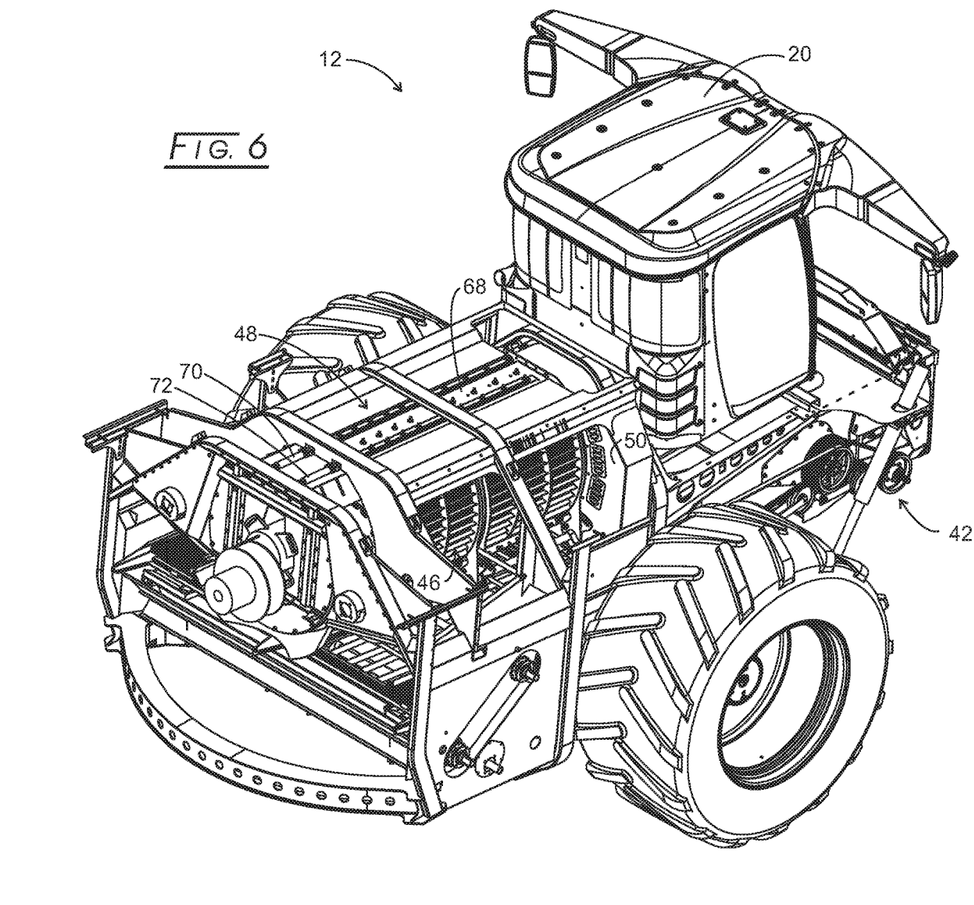
FIG. 6 is an isometric view like FIG. 5, but with components removed to enable a view of the top of the disclosed adjustable vanes assembly.

The operator is granted access to cab 20 by a stair assembly, 30, that extends upwardly from just above the ground and will be more fully disclosed in commonly owned application Ser. No. 15/654,786, filed Jul. 20, 2017 (U.S. provisional 62/375,986 filed Aug. 17, 2016), now abandoned. The skin or shell has been removed in FIG. 5 to reveal components housed within PPU 12. A fan assembly, 32, is located centrally for air to enter through screened air inlet 15. This location was chosen, as it arguably will be the cleanest flow of air around PPU 12. Radiators, as typified by a main cooling system air box, 34, surround fan assembly 32 and are coolingly connected with a pair of engines, 36 and 38, located on either side of main cooling fan assembly 32. Engine 36 powers the hydraulics for articulated combine 10, while engine 38 powers all other components of articulated combine 10. Exhaust after treatment assembly, 40, cleans air for emission control. When firing up the engines, which typically will be diesel engines, engine 38 is started first so that coolant flowing through engine 38 will warm up engine 36 and the hydraulic fluid for articulated combine 10. The twin engines aspect will be described in detail in commonly owned application Ser. No. 15/643,685, filed Jul. 7, 2017 (U.S. Provisional 62/358,629 filed Jul. 6, 2016) and the airflow also will be described in detail in commonly owned application Ser. No. 15/642,799, filed Jul. 6, 2017 (U.S. Provisional 62/358,629 filed Jul. 6, 2016). Other components visible in FIG. 56 will be described in detail in the referenced applications.

Grainhead 18 (see FIGS. 1 and 2) typically will be between about 30 and 50 feet wide and severs the crop in various fashions from its stalk or its attachment to earth. Grainhead 18 is carried by feed assembly, which conveys the severed crop consisting of both stalk and grain. By convention in the industry and herein, all material that is not grain is referred to as "Material Other than Grain" or, simply, "MOG". A feeder house assembly, 42 (FIG. 3) is disclosed in commonly assigned application Ser. No. 15/621,218 filed Jun. 13, 2017. Power to feeder house assembly 42 involves a pulley assembly, 44, which drives a drive shaft assembly (not seen).

Figure 7:
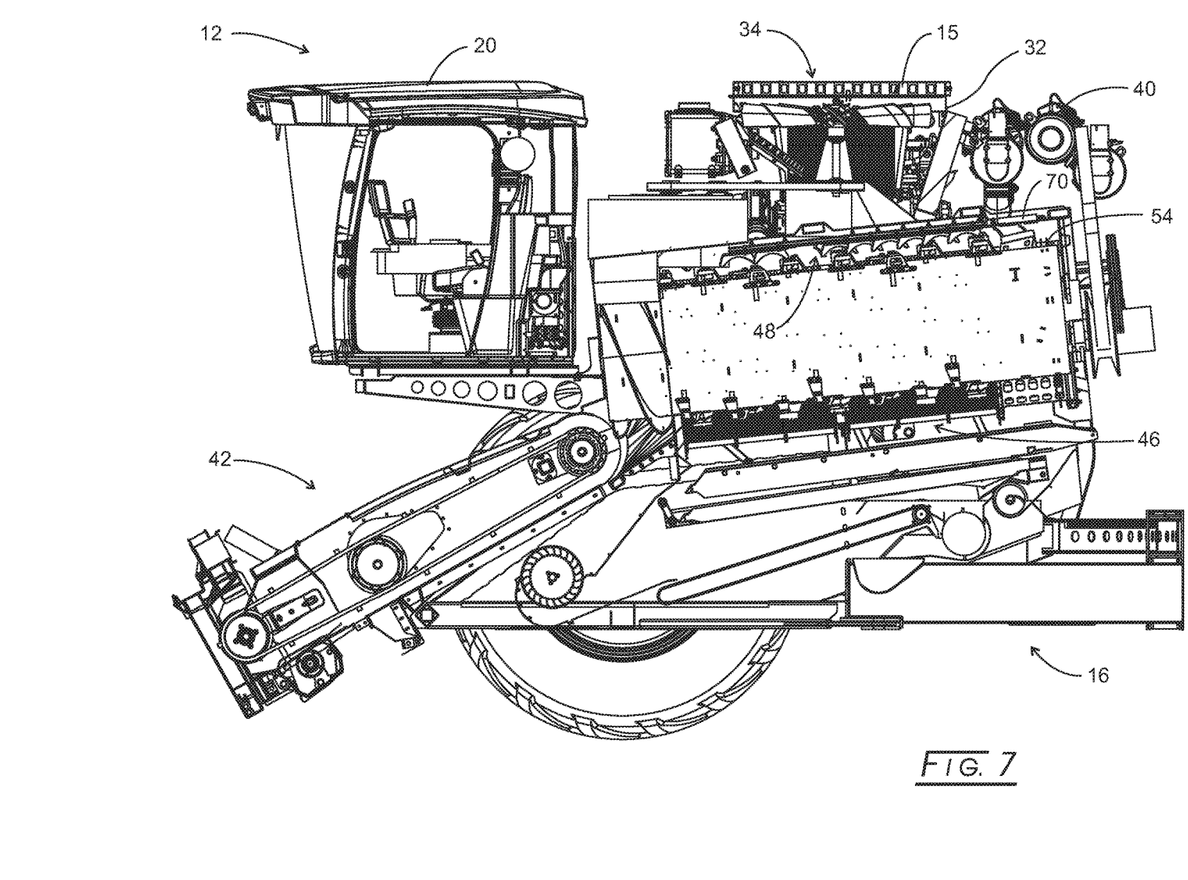
FIG. 7 is a sectional view taken along line 7-7 of FIG. 2.
Figure 9:
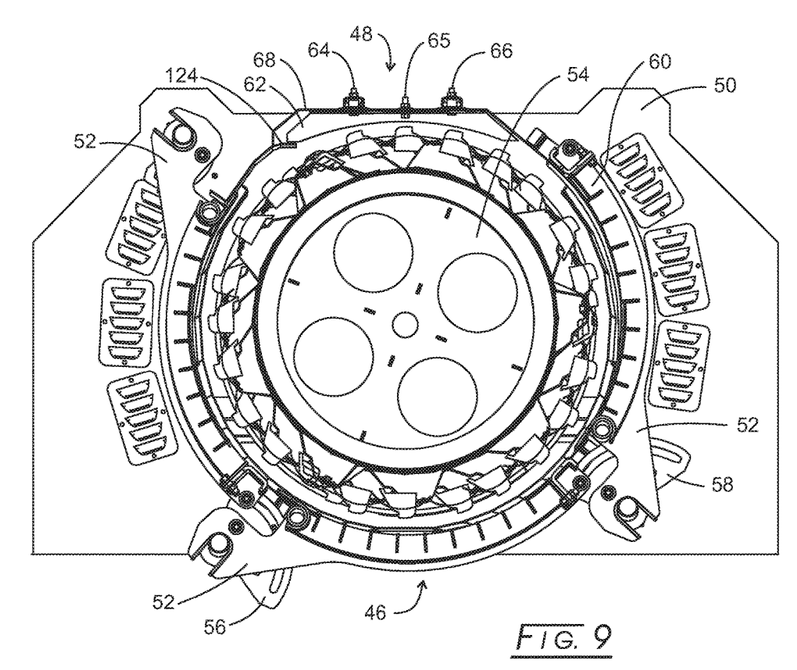
FIG. 9 is a sectional view taken along line 9-9 of FIG. 8.

A concaves assembly, including rotor assembly, concaves assembly, and grates assembly, is located below grate 15 in the interior of PPU 12, as is generally indicated by a reference numeral, 46, and described in detail in commonly owned application Ser. No. 14/967,691, referenced above. In FIG. 9, a cross-section through the concaves assembly is seen to include, inter alia, a forward bulkhead, 50, a frame assembly, 52, a rotor assembly, 54, slotted plates, 56 and 58 (for adjustment of the concaves), and a skeleton, 60. The disclosed adjustable vanes assembly and the subject of this application is generally indicated a reference numeral, 48, in FIG. 7. A vane, 62, and bolt assemblies, 64, 65, and 66, for retaining vane 62 also are seen in FIG. 9.

Figure 8:
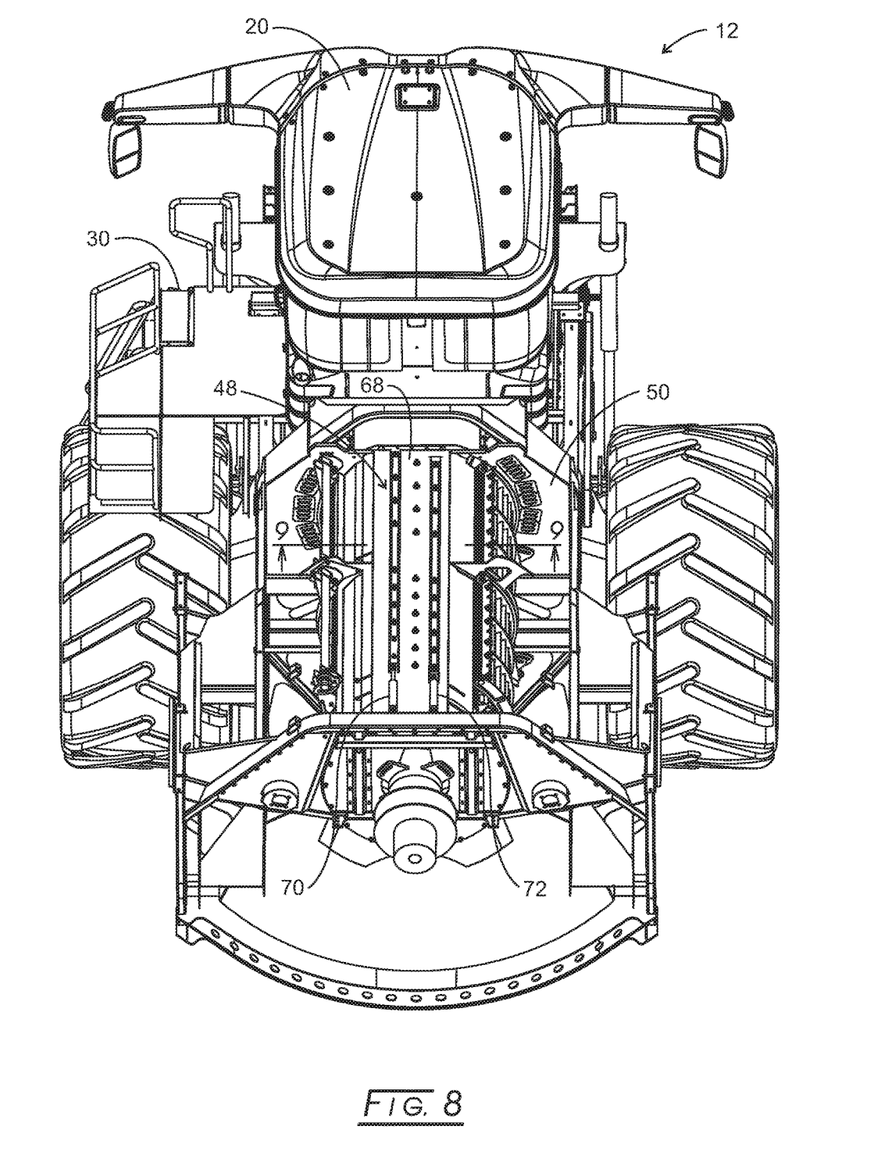
FIG. 8 is a top view of the PPU of FIG. 5.
Figure 10:
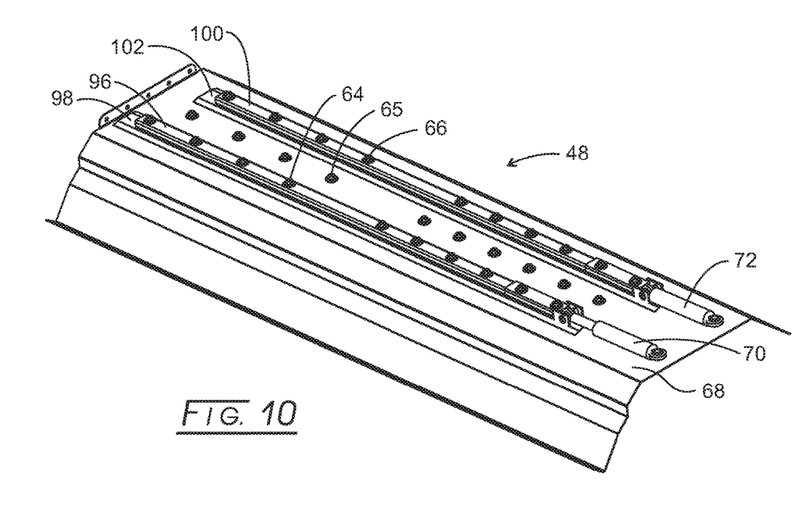
FIG. 10 is an isometric view of the disclosed adjustable vanes assembly.
Figure 11:
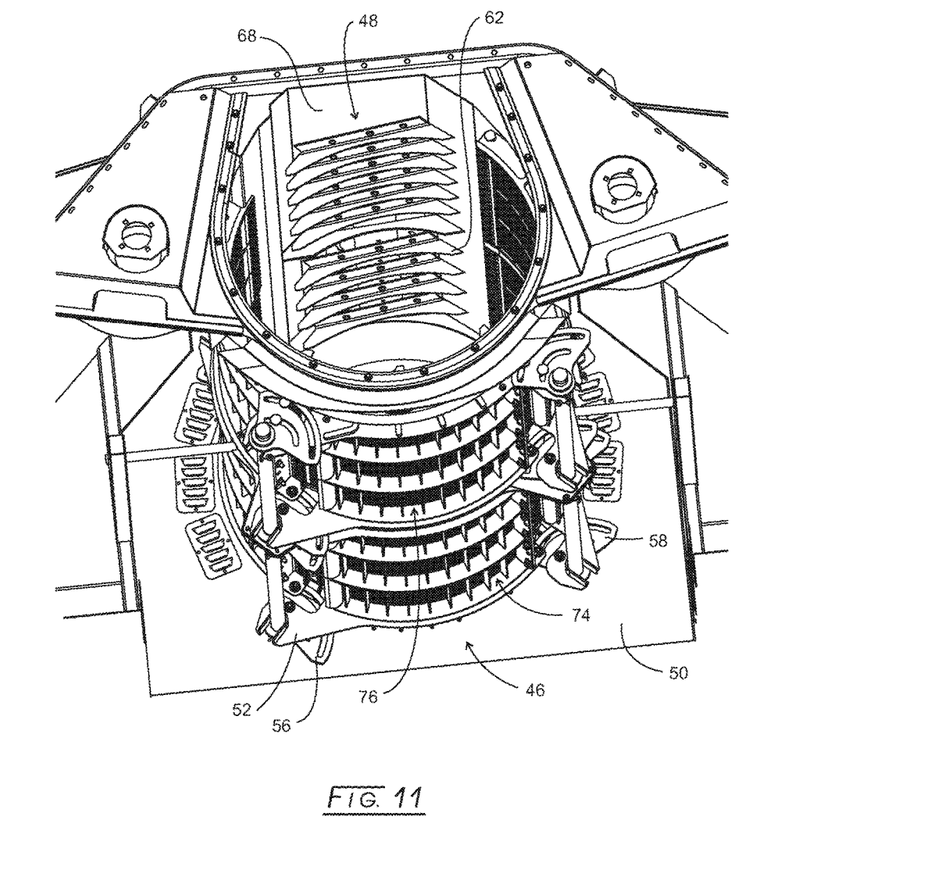
FIG. 11 is an isometric view of the cage assembly and disclosed adjustable vanes assembly.

In FIG. 8, an outer top view of the disclosed adjustable vanes assembly is seen to include a top cover, 68, and linear actuators, 70 and 72 for the vanes. FIG. 10 reveals further detail in showing the outside of vane assembly 48 in greater detail. Top cover 68 is seen to have a flat top section with outer slanted sections extending downwardly from the top flat section. Bolt assemblies 64, 65, and 66 (seen from the inside in FIG. 9) are seen from the outside. It should be appreciated that while two linear actuators for gang adjustment of all of the vanes is embodied in the drawings, the vanes could be divided into two, three, or more sections, each section being driven by their own pair of linear actuators. FIG. 11 reveals a concaves assembly, 74, and a grates assembly, 76, along with the other structural components forming such assemblies.

Figure 15:
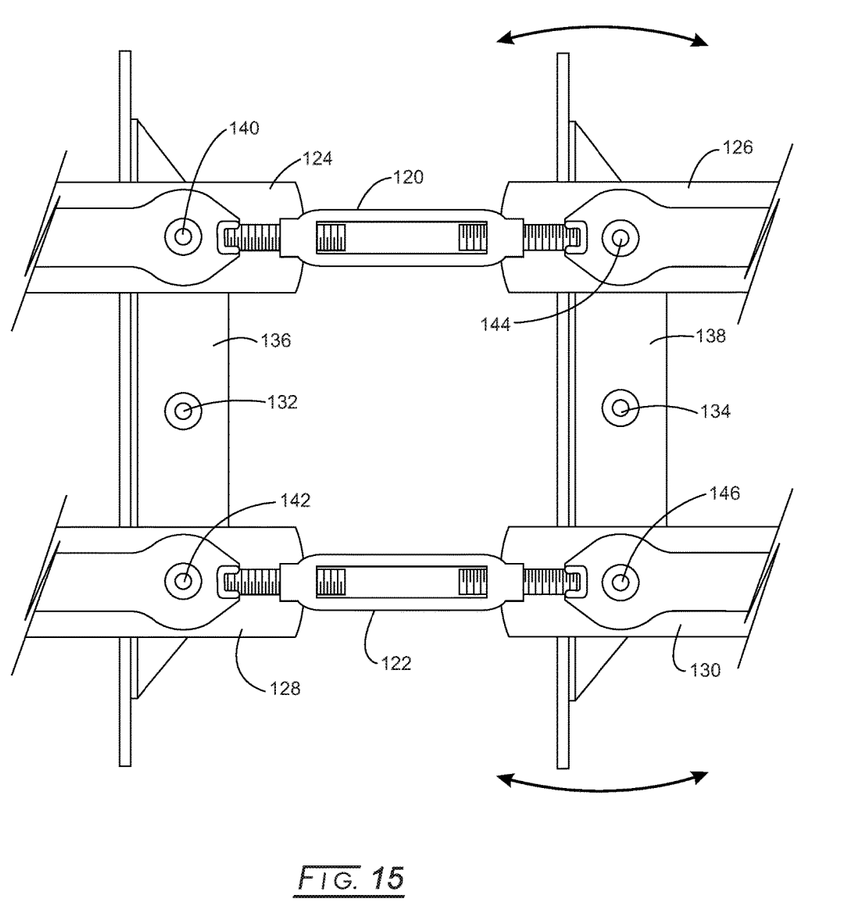
FIG. 15 is an overhead view of a turnbuckle system for connecting adjacent gangs of vanes.

Alternatively, the gangs could be divided as suggested above, and also could be connected back together by a turnbuckle type mechanism that would allow, for example, the front section of the vane gang to be angled differently in the front from that of the rear. In this case, as the actuators change the angle of the entire gang, the front and rear sections of the gangs would be maintained at that given angle differential. FIG. 15 illustrates such a turnbuckle system for two sets of parallel vane assemblies, where turnbuckles, 120 and 122, connecting, respectively, two adjacent pairs of bars, 124 and 126, and 128 and 130. Central pivots, 132 and 134, are associated, respectively, with vanes, 136 and 138. Bolt assemblies, 140 and 142, are associated with vane 136, while bolt assemblies, 144 and 146, are associated with vane 138. The arrows illustrate that each gang of vanes can be rotated in both directions.

Figure 12:
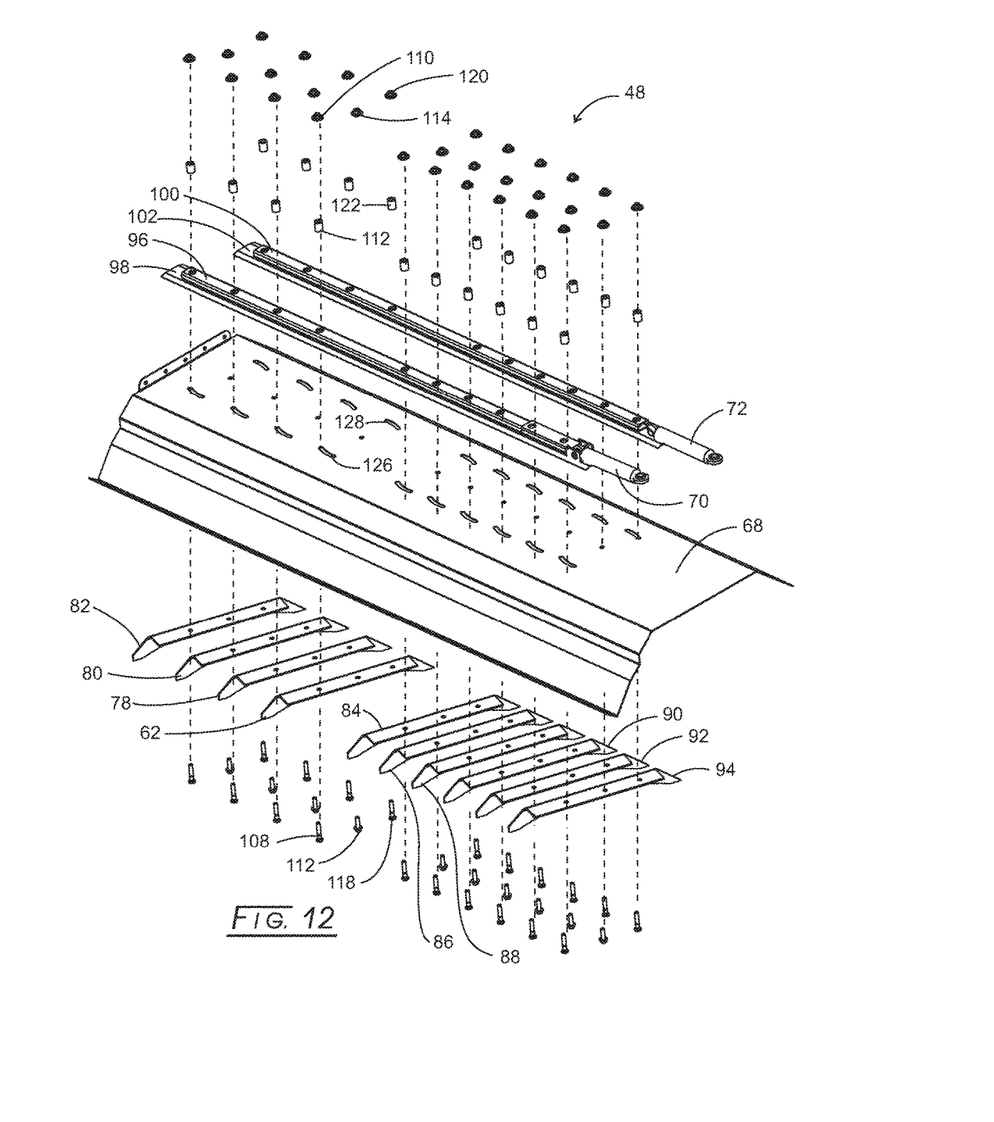
FIG. 12 is an exploded isometric view of the disclosed adjustable vanes assembly showing the components thereof.
Figure 13:
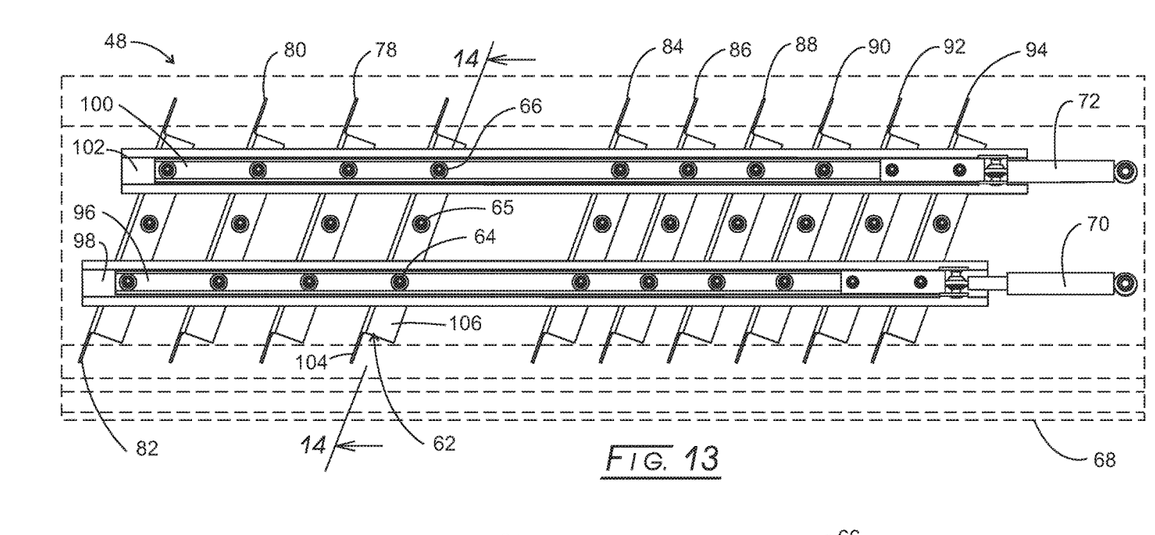
FIG. 13 is an overhead view of the disclosed adjustable vanes assembly showing the adjustability components.
Figure 14:
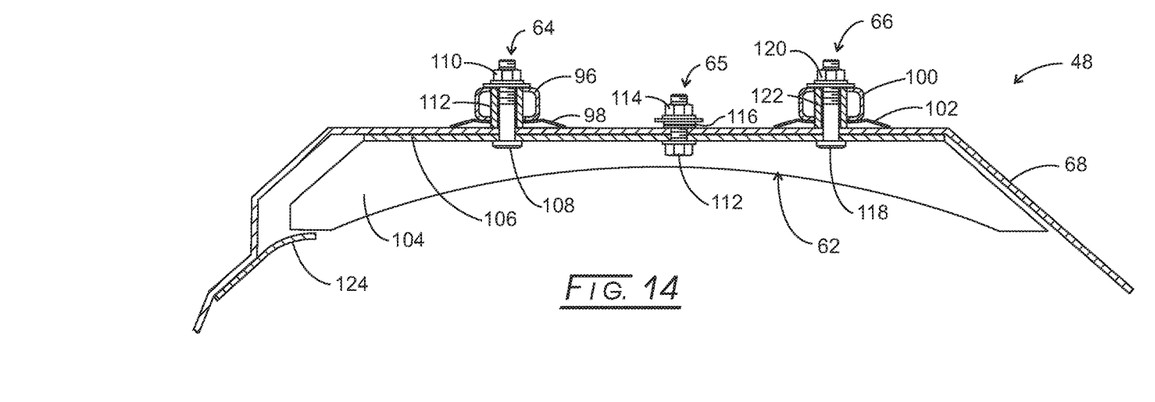
FIG. 14 is a sectional view taken along line 14-14 of FIG. 13.

FIGS. 12-14 show the various components of vanes assembly 48 in detail. Four adjustable vanes, 62, 78, 80, and 82, are shown in association with concaves assembly 74, and six vanes, 84, 86, 88, 90, 92, and 94, are shown in association with grates assembly 76. The skilled artisan will appreciate that the number of vanes shown in the drawings may be greater or lesser in number, which adds to the design flexibility of the disclosed adjustable vanes assembly.

Linear actuator assembly 70 is connected to an oval-like or a flat bar, 96, that rests atop a convex bar, 98, each of these bars running almost the entire lengthwise extent of vanes assembly 48. A series of apertures penetrate through both bars 96 and 98 and align with apertures formed in cover 68. In similar fashion, linear actuator assembly 72 is connected to an oval-like or a flat bar, 100, that rests atop a convex bar, 102, each of these bars running almost the entire lengthwise extent of vanes assembly 48. A series of apertures penetrate through both bars 98 and 102 and align with apertures formed in cover 68. Bars 98 and 102 can be made of stainless steel and exhibit a spring characteristic allowing them to be pushed/pulled down tightly against cover 68. Such construction allows bars 98 and 102 to slide against cover 68 as the adjusting tubes are moved fore and aft, but also serves to seal off the ingress and egress of material that would otherwise try to exit the rotor cage through the arcuate slots.

For illustrative purposes, the retention and adjustment of vane 62 will be used to describe all of the vanes of vanes assembly 48. Vane 62 is formed from a downwardly extending leg, 104, and a relatively flat horizontal plate, 106. Apertures are formed in horizontal plate 106 that align with the apertures formed in bars 96 and 98. A bolt, 108, and locking nut, 110, are used to hold down bars 96 and 98. An extended tube or bushing, 112, is inserted between cover 68 and locking nut 110 and forms a smooth surface for bar 98 to move for consequent moving and adjustment of one end of vane 26. The pivot about which vane 104 rotates to provide its rake angle with respect to the direction of flow of material being threshed is bolt assembly 65 formed of a bolt, 112, locking nut, 114, and washer, 116.

In similar fashion, apertures also are formed in horizontal plate 106 that align with the apertures formed in bars 98 and 102. A bolt, 118, and locking nut, 120, are used to hold down bars 100 and 102. An extended tube or bushing, 122, is inserted between cover 68 and locking nut 120 and forms a smooth surface for bar 100 to move for consequent moving and adjustment of the other end of vane assembly 26. As shown in FIG. 10, linear actuator assembly 70 is in an extended position, while linear actuator assembly 72 is in a retracted position to pivot vane 104 about bolt 112. By reversing the extension/retraction of linear actuators 70 and 72, vane assembly 26 rotates in the opposite direction. Because rotor 54 is rotating counter-clockwise, material being threshed will bunch up ("hairpinning") of the left side of vane assembly 26. To ensure that the material does not accumulate in the space about the left hand side of vane assembly 26, a plate, 124, runs along the extent of adjustable vanes assembly 48 to assist in the material flowing in the desired counter-clockwise direction and not interfere with movement of vane assembly 26. As noted above, all of the vanes are similarly constructed in the fashion described for vane assembly 26. Also, as noted above, two or more groupings (gangs) of vanes can be attached to different linear actuators for moving such groupings of vanes. Bars 96 and 100 are compressed by tightening of the bolts and act as a biasing member keeping the vanes tight against the inner flat roof of cover 68.

Looking back to FIG. 12, the components of FIG. 14 are seen in exploded view. In order for the ends of the vanes to rotate about the central bolt, arcuate slot pairs are formed in the top flat section of cover 68, such as illustrative arcuate slot pair, 126 and 128, for the ends of the vanes to rotate.

While the device and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by

We claim:

1. A harvesting combine rotor cage top cover assembly of a rotor cage through which there is a flow of material, which comprises:
    (a) an overhead roof formed from a substantially horizontal flat section and downwardly angled side sections; and
    (b) a series of substantially parallel vanes located beneath the overhead roof, each vane formed from a substantially flat top section located against the roof horizontal flat section and downwardly laterally extending legs being angled on their sides and having an arcuate bottom, the downwardly laterally extending legs of the vanes being rotatable about a central pivot for promoting or retarding the flow of material in the rotor cage;
    (c) parallel bars located atop the overhead roof substantially horizontal flat section and which attach about either side of the central pivot using bushing spacers, the parallel bars flexing and sealing against the overhead roof;
    (d) arcuate slots formed in the overhead roof substantially horizontal flat section on either side of the central pivot;
    (e) linear actuators attached to each of the parallel bars; and
    (f) bolt assemblies extending through each vane, arcuate slot, and parallel bars, such that oppositely moving each linear actuator results in gang rotation of the vanes about the bolt assemblies,
    wherein the vanes and overhead parallel bars are divided into sections, each section being driven by a different linear actuator for separately adjusting the angle of the vanes in each section;
    wherein each section of vanes is set at an angle from at least one other section and the angles of each section of vanes is held constant relative to the at least one other section; and
    wherein a connecting mechanism is used to maintain the different angle of each section relative to the at least one other section.

2. The harvesting combine rotor cage top cover assembly of claim 1, wherein the connecting mechanism is a turnbuckle assembly.

3. A harvesting combine rotor cage top cover assembly, which comprises:
    (a) an overhead roof having arcuate slots and downwardly angled side sections;
    (b) a series of substantially parallel vanes located beneath the overhead roof, each vane formed from a top section located against the roof and downwardly laterally extending legs being angled on their sides and having an arcuate bottom, the sides of the vanes being rotatable about a central pivot for promoting or retarding the flow of material in the rotor cage;
    (c) parallel bars located atop the overhead roof and which attach about either end of the vanes using bushing spacers, the parallel bars flexing and sealing against the overhead roof;
    (d) linear actuators attached to each of the parallel bars; and
    (e) bolt assemblies extending through each vane, arcuate slot, and parallel bars, such that oppositely moving each linear actuator results in gang rotation of the vanes about the bolt assemblies,
    wherein the vanes and overhead parallel bars are divided into sections, each section driven by a different linear actuator for separately adjusting the angle of the vanes in each section;
    wherein each section of vanes is set at an angle from at least one other section and the angles of each section of vanes is held constant relative to the at least one other section; and
    wherein a connecting mechanism is used to maintain the different angle of each section relative to the at least one other section.

4. The harvesting combine rotor cage top cover assembly of claim 3, wherein the connecting mechanism is a turnbuckle assembly.

* * * * *